United States Patent [19]

Munch

[11] Patent Number: 5,176,478
[45] Date of Patent: Jan. 5, 1993

[54] FIBERGLASS PLANING MACHINE

[76] Inventor: Mattias Munch, 1225 E. Gemini Dr., Annapolis, Md. 21403

[21] Appl. No.: 675,162

[22] Filed: Mar. 26, 1991

[51] Int. Cl.⁵ .............................................. B23C 1/20
[52] U.S. Cl. ..................................... 409/137; 51/176; 144/208 R; 409/139; 409/181
[58] Field of Search ............... 409/139, 181, 137, 134, 409/175; 144/208 R; 51/273, 170 PT, 176

[56] References Cited

U.S. PATENT DOCUMENTS

| | | | |
|---|---|---|---|
| 1,977,088 | 10/1934 | Richardson | 51/273 X |
| 2,393,463 | 1/1946 | Gottlieb | 51/170 PT X |
| 2,440,440 | 4/1948 | Hadwiger | 51/273 X |
| 2,773,337 | 12/1956 | De Marchi | 51/176 |
| 3,044,366 | 7/1962 | Bidart | 409/181 |

FOREIGN PATENT DOCUMENTS

| | | | |
|---|---|---|---|
| 1240860 | 8/1960 | France | 144/208 R |
| 1280025 | 11/1961 | France | 51/273 |
| 8500375 | 9/1986 | Netherlands | 409/139 |
| 496995 | 3/1976 | U.S.S.R. | 144/208 R |

*Primary Examiner*—William Briggs
*Attorney, Agent, or Firm*—John K. Donaghy

[57] ABSTRACT

A rotary stripper tool comprising a housing; a motor supported on the housing; a shaft supported in the housing; a cutter head supported on the shaft; a drive between the motor and the shaft for rotating the cutter head; guides on the shaft; a vacuum supported on the housing for removing dust and shavings from the work area; and hand supports for the tool.

8 Claims, 3 Drawing Sheets

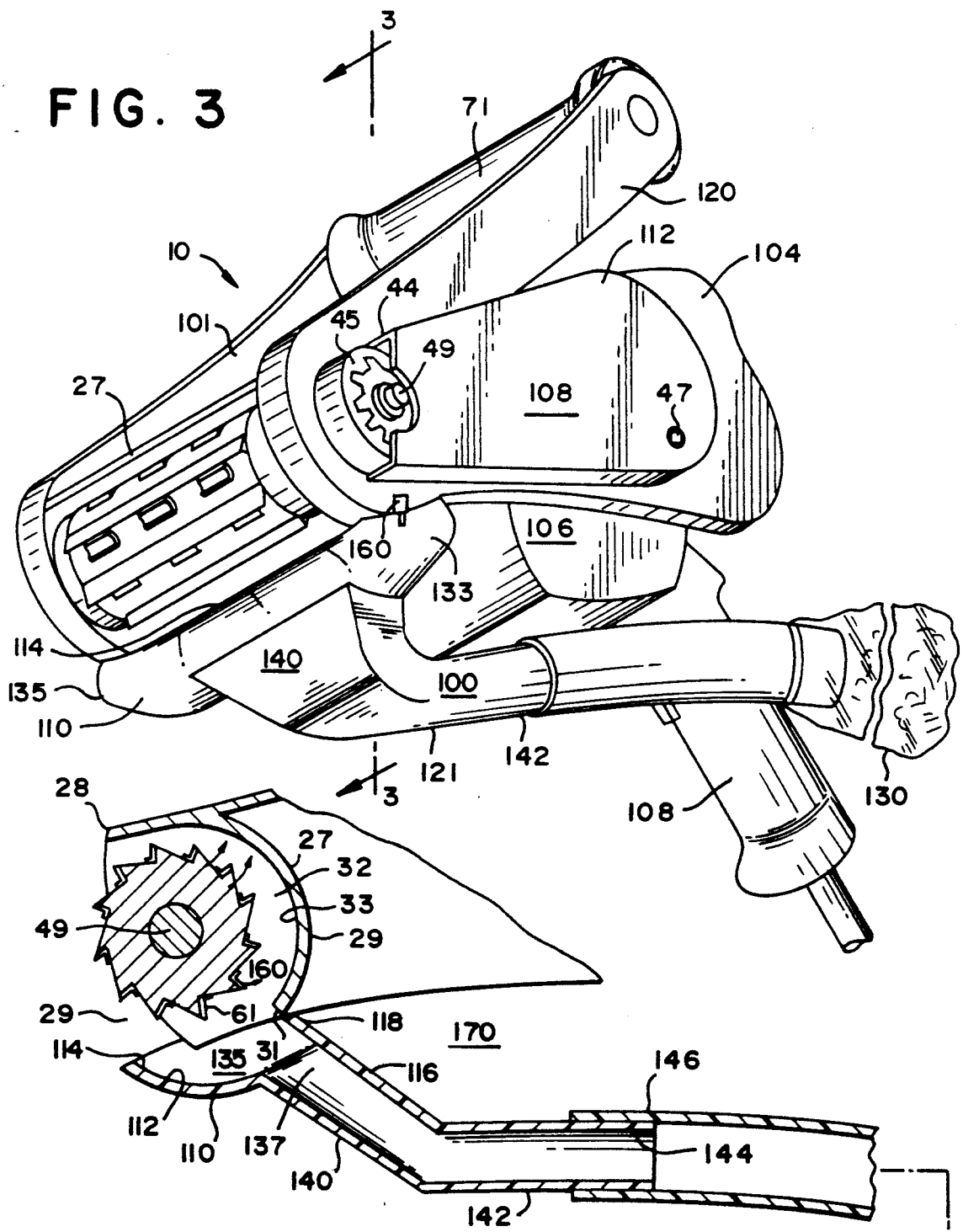

FIBERGLASS PLANING MACHINE

BACKGROUND OF THE INVENTION

1. Field of the Invention

This invention pertains to a machine for planing hard surfaces and particularly for removing gelcoat and fiberglass laminates from boats.

2. Background of the Prior Art

The old prior art devices included grinders and sanders for removing damaged gelcoat or fiberglass as a result of osmosis damage to such areas. These devices were often inadequate, time-consuming and created hazardous conditions due to fiberglass-laden air. Representative of known prior art similar devices not for this specific purpose include:

Lofstedt, U.S. Pat. No. 2,064,173, Plate Shaving Machine

Draheim, U.S. Pat. No. 2,166,861, Portable Grinder

Danforth, U.S. Pat. No. 2,264,278, Rotary Device . .

Powanda, U.S. Pat. No. 3,395,495, Vehicle Body Sander.

These devices are for use on surfaces other than boat fiberglass and are therefore inadequate because of the specific considerations pertaining to fiberglass surfaces and the contours encountered on boats as well as the critical depth of cut required to remove blistered areas.

Other recent prior art devices for this purpose include rotary stripper devices whereby the gelcoat and fiberglass is removed in strips by a rotary tool having a plurality of blades. Representative of the new prior art devices are:

Dodds, U.S. Pat. No. 4,948,307, Stripping Device

Mombers, U.S. Pat. No. 8,500,375, Device for Planing . . .

The Dodds machine is for use on boats and includes guide skids attached to the housing which need individual adjustment to ensure a proper depth of cut. A hydraulic drive is used which adds weight to the machine such that it is difficult to operate.

Mombers shows a rotary cutter head and guides which are spaced apart on the cutter head support shaft.

SUMMARY OF THE INVENTION

There is a need for a lightweight machine for planing gelcoat and fiberglass from the sides of a boat which is inexpensive to manufacture and easy to operate.

It is therefore one object of this invention to provide such a machine which includes a rotary cutter head supported on a shaft in a housing.

Another object of this invention is to provide a machine including a rotary cutter head on a shaft and guides adjacent the cutter head which function to determine the depth of cut. The guides are rollers but may be any suitable devices.

It is another object of this invention to provide a rotary stripper for boat hulls which has a power unit mounted on the housing. The power unit may be electric or the like.

It is yet another object of this invention to provide a rotary stripper for boat hulls which includes a rotary cutter head having a plurality of individual cutter teeth removably mounted about the periphery of the cutter head.

And another object of this invention is to provide a rotary stripper for boat hulls having a vacuum for removing dust and shavings from the work area, thus, eliminating environmentally hazardous conditions.

Yet another object of this invention is to provide a rotary stripper for boat hulls having a housing cover wall coextensive with a vacuum hood wall to form a housing substantially surrounding the cutter head whereby dust and shavings are collected and conveyed to a collection point adjacent to, or remote from, the tool.

Still another object of this invention is to provide a means on the vacuum for collecting and storing the dust and shavings thus providing a safe environment for workers.

These and other objects of the invention will become apparent from a reading of the following specifications when taken in light of the annexed drawings.

BRIEF DESCRIPTION OF THE DRAWINGS

FIG. 3 is a perspective view of the rotary stripper showing a drive motor, a vacuum device attached thereto and hand supports.

FIG. 4 is a side view in section taken through the line 3—3 of FIG. 3.

The described invention is intended for use primarily in the boat repair industry and specifically in the repair of fiberglass hulls of boats of all sizes. However, its use will not be limited to fiberglass in boats, but fiberglass in general where applicable.

The invention removes gelcoat (coating over fiberglass) and/or consecutive layers of fiberglass laminate.

The invention is specifically designed to remove osmoically blistered gelcoat and/or fiberglass laminate in an efficient and an enviromentally attractive and safe fashion.

The invention planes off gelcoat and/or fiberglass laminate duplicating the existing contour of the hull or boat bottom. The cutter head and work area is continually vacuumed to prevent toxic dust and shavings from being released into the air. The dust and shavings are collected in a receptacle and disposed of conveniently and efficiently. Interchangeable color-coded depth gauges allow change in the depth of the cut. The depth gauges are roller guides and are preselected and installed on the machine before the work begins. Gelcoat and fiberglass are removed anywhere from an 0 to ¼ inch dept at a rate of four square feet per five minutes leaving a consistent and fair surface.

DESCRIPTION OF THE PREFERRED EMBODIMENT OF THE INVENTION

Figure 1:
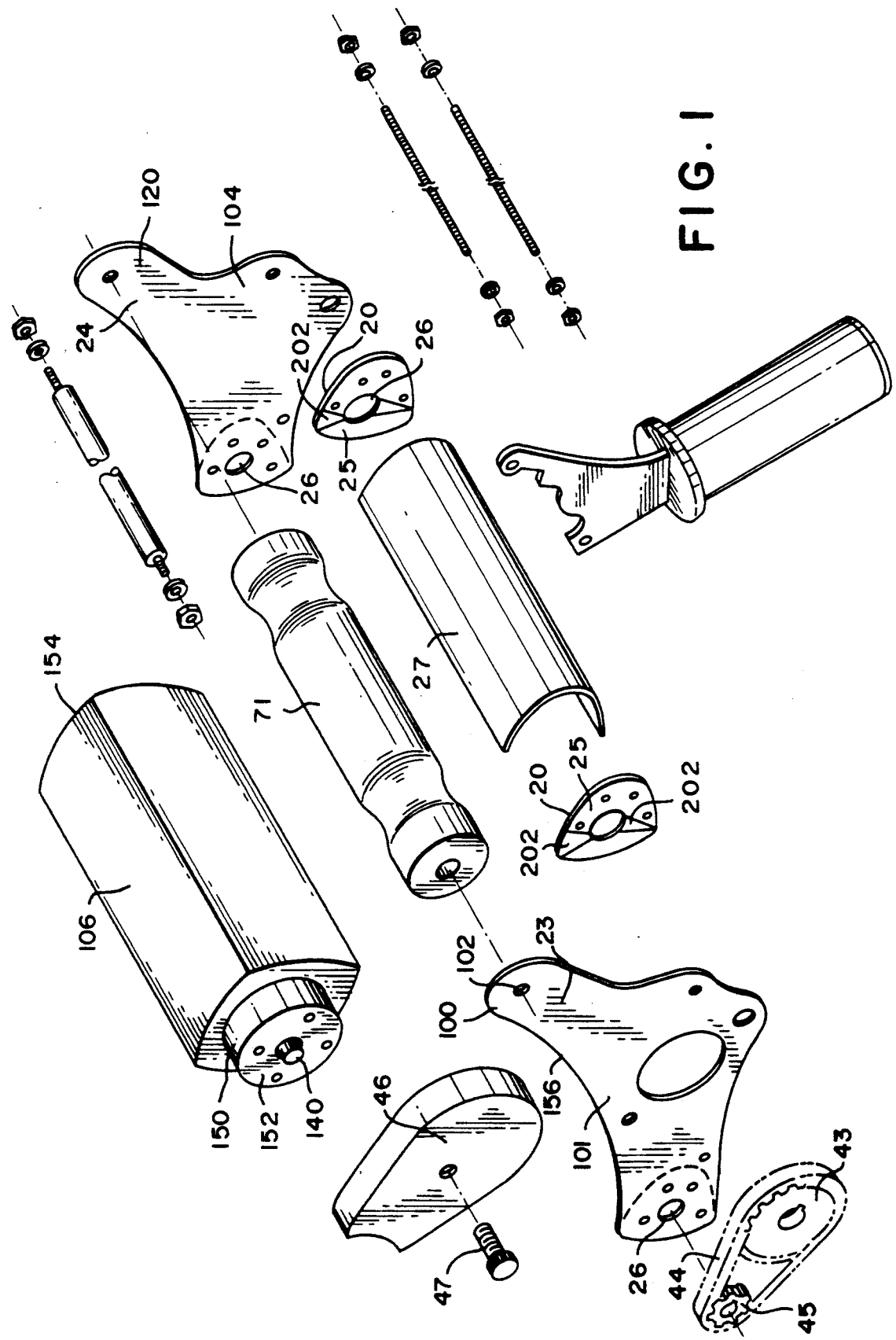
FIG. 1 is a perspective view of various elements of the rotary stripper of this invention.
Figure 2:
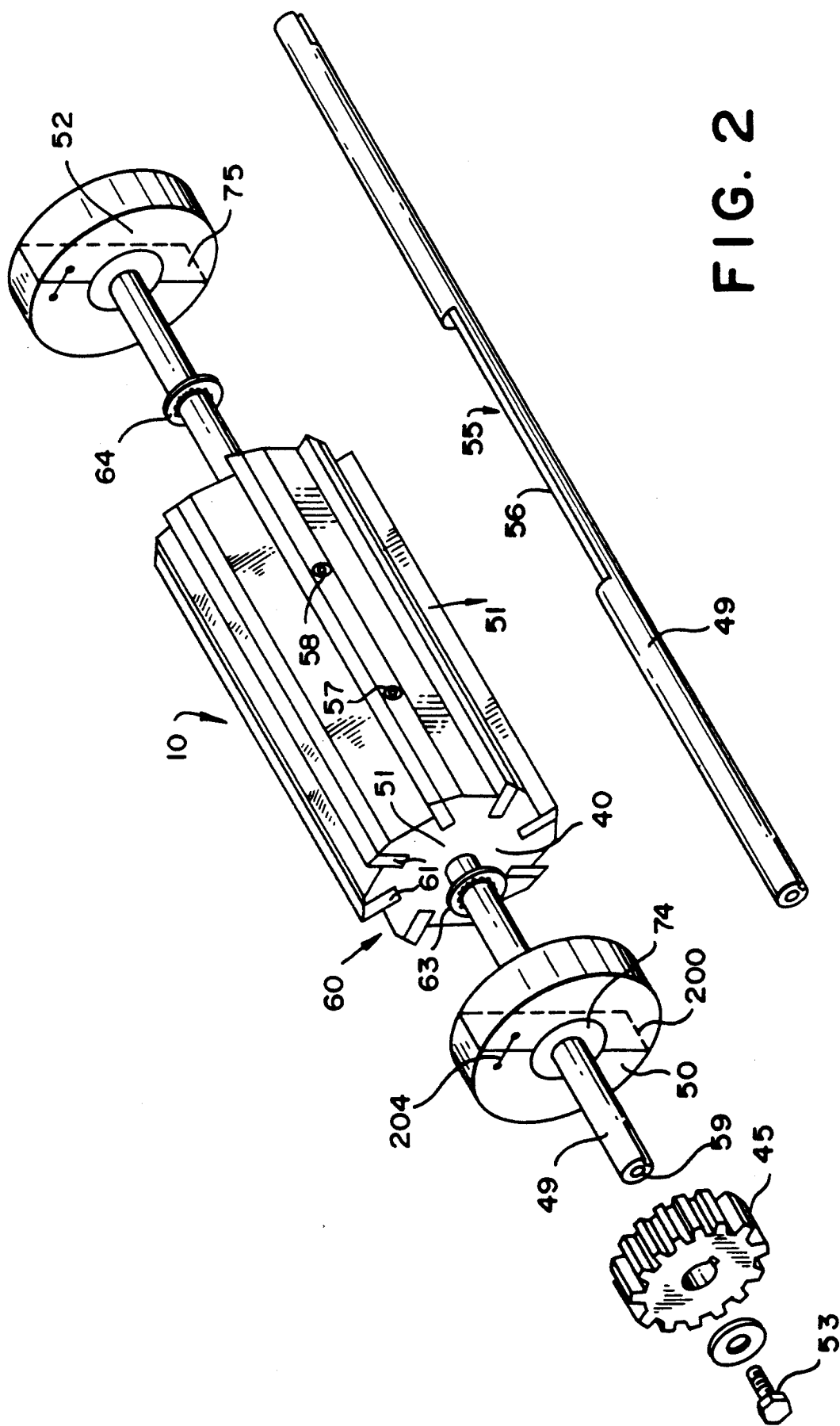
FIG. 2 is a perspective view of the cutter head, support shaft and roller guides of the invention.

Turning now to a more detailed description of the invention, FIGS. 1 and 2 show a rotary stripper 10 consisting of two quarter inch thick aluminum sideplates 23, 24. Each is of a different shape. Sideplate 23 has a wall portion 101, and a tip 100 having an aperture 102. The other sideplate 24 has a side wall 104 substantially larger than the side wall 104 of sideplate 23. It will be seen that the large sideplate 24 supports an electric motor 106 having a drive train 108 to drive the shaft 49 of the cutter head 51. A cover 112 is attached to the sideplate 24 and protects the drive train. Fastened into the front of the sideplates are two aluminum cheek plates 25, three eighths inch thick. Ball bearings 26 sit within these sideplates and cheek plates. The cheek plates also provide a ledge for supporting an eighth inch half round aluminum cover 27 for the housing which protects the cutter head 51 and roller guides to be more fully described below.

The housing cover 27, FIG. 4, may be attached to the cheek plate 25 by any suitable means such as bolts to allow the same to be removed or by welding to provide a permanent fixture. It will be seen that the cover 27, FIGS. 3 and 4, surround the cutter head 51 and have ends 28 and 31 diametrically opposite each other. The ends 28 and 31 and wall portion 33 therebetween define a housing 32 substantially enclosing the cutter head 51 and teeth 61 as shown.

The sideplate 24 has a wing or tip 120 having an aperture. A handle 71 is secured between the tip 100 and 120.

The motor 106 has drive shaft 140 which is attached to the drive train 108 which in turn is attached to the drive shaft 49 of the cutter head 51. Motor 106 may be electric or any other type.

The motor 106 has a neck 150 with end plate 152 attached to the sideplate 24 by bolts or the like. The opposite end 154 projects over the edge 156 of the sideplate 23 and may rest thereon for support.

It will be seen that a pulley belt 44 connects the shaft 49 of the cutter head and the shaft 140 of the motor through a suitable drive train. Both pulleys and the belt are housed under an aluminum cover 108 which is attached to the assembly with a machine screw 47.

The cutter head shaft 49, FIG. 2, runs through the ball bearings 26 in both sideplates 23, 24 and a pulley belt 44 is trained about the left side of the shaft on a pulley 45. Between the two cheek plates 25, moving from left to right, FIG. 2, the shaft 49 runs sequentially through a cheek plate 25, a roller guide 50, the cutter head 51 and then another roller guide 52 and a check plate 25. The shaft is held in place with two machine screws 53, 54 one in each end of the shaft, along with a washer to fit. Two inches in the middle of the cutter head shaft are machined into a flat surface 55. There is a groove 56 in the middle of the flat surface for two set screws 57, 58 which fasten the cutter head in place. The left side of the shaft has a one inch keyway 59 cut into it in order to lock the smaller pulley in place.

The cutter head 51 is made of tool-steel and is approximately two and three quarter inches long and two inches in diameter. Eight flukes 60 have been cut into it. The flukes 60 are approximately one half inch deep, angle forward at six degrees and are slightly forward of the center. Approximately twenty eight C4 carbide teeth 61 are secured by any suitable means, such as by soldering or by set screws, into these eight flukes. They are staggered and overlap so the cut surface may be completely flat. The cutter head 51 is fastened to the shaft via two set screws 57, 58 as explained above. The shaft goes through the one half inch diameter hole 63 bored through the middle of the cutter head.

Spaced away from the cutter head on either side of it by (one half inch) stainless steel washers 63, 64 are two roller guides 50, 52 which ensure the carbide teeth can only dig in by a chosen depth. These roller guides have ball bearings 74, 75 with aluminum rings press-fitted onto them in order to extend their diameters. The right hand roller guide 52 duplicates the diameter of the cutter head and provides for a flush cut. The left roller guide 50 is slightly smaller than the cutter head diameter and allows the cutter head to dig its teeth into the material to be cut. In order to provide for a different depth of cut, another roller guide of yet another different diameter is chosen and inserted on the left side of the cutter head. A set of roller guides 50 is provided in different colors corresponding to a particular depth of cut to be taken from the boat. This feature is very important as it permits preselection of a roller guide 50 corresponding to a depth of cut necessary to remove damaged fiberglass. This predetermined selection eliminates guess work on the part of an operator and consequently eliminates possible damage to a boat which might otherwise occur with other types of guides which are manually adjusted. Another important feature of the roller guides 50, 52 is their close abutment against the side faces 40 (one shown) of the cutter head 51. This arrangement permits the machine to closely follow the contour of the boat surface whereby an optimum cut is obtained. Conversely, the farther away the guides are from the cutter head, the less the machine will follow the contour of the boat. Further, the close abutment of the roller guides to the faces of the cutter head prevents debris and dirt from getting between the roller guides and the cutter head.

The roller guides may be locked into place (therefore not roll). The two sideplates may accommodate two stainless steel brackets to serve as adjustable guides as an alternative to the roller guides. Alternatively, the rollers 50, 52 may be hinged at 200 so as to permit them to be attached or removed without lateral movement on the shaft 49. Further, the rollers 50, 52 may be attached to the inside or outside of the cheek plates in keyways 202 or the like. Securing means 204 hold or fasten the halves of the rollers together.

FIG. 3 shows the rotary stripper 10 assembled and ready to use. A vacuum 100 comprising a vacuum hood 110, a hose 121, and a dust and shaving receiving bag 130. A vacuum motor (not shown) is attached to the hose 121 in the usual manner typical of these devices as are sold under the trade name DIRT DEVIL.

The vacuum head 110 has a tray portion 112 with a front lip 114 substantially forward of the shaft 49. The tray portion 112 has a long back wall 116 whose upper edge 118 abuts the end wall 31 of the housing cover 27 to form a tight seal therealong. In this regard, it will be apparent that no dust or shavings may escape to the back 170 of the tool. The tray portion 112 has vertical side walls 133 and 135 and an opening 137 leading to an open tube 140. The tube 140 tapers to a hollow cylindrical tube 142 having an open end 144. The tube 142 may be any desired length and is connected to a vacuum motor 150. A dust and shavings receiving bag 130 may be interposed between the tube 142 and the motor 150 in the usual manner. A handle 180 extends from the motor 106.

It will be seen that the upper edge portion 118 of the tray 112, together with the side walls 133 and 135 and the lip portion 114 cooperating with the cover 27 form a large open housing 29 which substantially surrounds the cutter head 51. Thus it will be apparent that dust and shavings 160 are propelled from the cutter head 51 into the open housing 29 and tray portion 112 and are drawn out by the vacuum into the bag 130. The collection bag 130 is removable and may be disposed of in any manner. The hood 110 may be removably attached to the housing by any suitable means such as bolts 160.

While the invention has been described with respect to a preferred embodiment thereof, it will be understood by those skilled in the art to which the invention pertains that numerous changes may be made in the machine to accommodate different situations without departing from the spirit and scope thereof.

What I claim is:

1. A rotary stripper tool comprising:
   a housing;
   a motor supported on the housing;
   a shaft supported in the housing;
   a cutter head supported on the shaft;
   a drive between the motor and the shaft for rotating the cutter head;
   guide means adjacent the cutter head;
   vacuum means supported on the housing;
   hand supports for the tool; and
   said guide means are roller guides hinged to permit attachment to said shaft.

2. A rotary stripper tool according to claim 1, wherein:
   said motor is an electric motor.

3. A rotary stripper tool according to claim 1, wherein:
   said vacuum means comprises a tray portion cooperating with the housing to form an open housing for collection of dust and shavings near the work area.

4. A rotary stripper tool according to claim 1, and
   said vacuum has a collection bag thereon for receiving dust and shavings.

5. A rotary stripper tool according to claim 1, and
   said cutter head has a plurality of teeth arranged in offset overlapping fashion about the periphery of the cutter head, and said teeth may be individually removed when worn.

6. A rotary stripper tool according to claim 5, wherein:
   said teeth are removably set into flukes cut in the cutter head.

7. A rotary stripper tool comprising:
   a housing;
   a motor supported on the housing;
   a shaft supported in the housing;
   a cutter head supported on the shaft;
   a drive between the motor and the shaft for rotating the cutter head;
   guide means adjacent the cutter head;
   vacuum means supported on the housing;
   hand supports for the tool;
   said guide means are roller guides on said shaft and abutting said cutter head; and
   said roller guides are hinged to permit attachment to said shaft.

8. A rotary stripper tool comprising:
   a housing;
   a motor supported on the housing;
   a shaft supported in the housing;
   a cutter head supported on the shaft;
   a drive between the motor and the shaft for rotating the cutter head;
   guide means being hinged to permit same to be positioned about said shaft and removably secured to said housing whereby said hinged guide means may be removed from said shaft and housing without lateral movement on said shaft;
   vacuum means supported on the housing; and
   hand supports for the tool.

* * * * *